(12) United States Patent
Sekimoto et al.

(10) Patent No.: US 7,786,637 B2
(45) Date of Patent: Aug. 31, 2010

(54) TOUCHDOWN BEARING

(75) Inventors: Hiroshi Sekimoto, Sakurai (JP); Akira Koyama, Kashiwara (JP); Masaaki Ootsuki, Kashihara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 23 days.

(21) Appl. No.: 11/792,003

(22) PCT Filed: Nov. 30, 2005

(86) PCT No.: PCT/JP2005/022005

§ 371 (c)(1),
(2), (4) Date: May 31, 2007

(87) PCT Pub. No.: WO2006/059651

PCT Pub. Date: Jun. 8, 2006

(65) Prior Publication Data

US 2008/0019628 A1  Jan. 24, 2008

(30) Foreign Application Priority Data

Dec. 1, 2004 (JP) ............................. 2004-348860
Dec. 1, 2004 (JP) ............................. 2004-348864

(51) Int. Cl.
*F16C 32/04* (2006.01)
*F16C 19/06* (2006.01)

(52) U.S. Cl. .................................................. 310/90.5

(58) Field of Classification Search ................ 310/90.5; F16C 32/04, 33/66, 19/06
See application file for complete search history.

(56) References Cited

U.S. PATENT DOCUMENTS

| 3,292,980 | A | * | 12/1966 | Gustafsson et. al. | ........ | 384/516 |
| 3,886,803 | A | * | 6/1975 | Jacobson et al. | ........... | 74/5.6 D |
| 5,271,679 | A |   | 12/1993 | Yamazumi et al. | | |
| 5,630,668 | A | * | 5/1997 | Ikezawa et al. | ............. | 384/527 |
| 6,617,733 | B1 | * | 9/2003 | Yamauchi et al. | .......... | 310/90.5 |

(Continued)

FOREIGN PATENT DOCUMENTS

JP    63-289317    11/1988

(Continued)

OTHER PUBLICATIONS

European search report dated Jul. 30, 2008.

(Continued)

*Primary Examiner*—Quyen Leung
*Assistant Examiner*—Naishadh N Desai
(74) *Attorney, Agent, or Firm*—McGinn IP Law Group, PLLC

(57) ABSTRACT

A calcium zinc phosphate-type coating is formed on at least one of those surfaces of an inner ring, an outer ring and rolling elements (balls) and further a cage (if the cage is used) (which form a touchdown bearing) contacting other members, and further a molybdenum disulfide coating is formed thereon. By doing so, the adhesion of the molybdenum disulfide coating is enhanced by microscopic pits and projections due to crystal grains on the surface of the calcium zinc phosphate-type coating, and also even when the molybdenum disulfide coating is worn out, the wearing-out of a substrate can be suppressed by the lubricating ability of the calcium zinc phosphate-type coating underlying it.

19 Claims, 4 Drawing Sheets

U.S. PATENT DOCUMENTS

| | | | |
|---|---|---|---|
| 6,833,643 B2 * | 12/2004 | Beyer et al. | 310/90.5 |
| 6,921,205 B2 | 7/2005 | Kanayama et al. | |
| 7,249,892 B2 * | 7/2007 | Takemura et al. | 384/450 |
| 2002/0141674 A1 * | 10/2002 | Ooitsu et al. | 384/527 |
| 2003/0099416 A1 * | 5/2003 | Kinno et al. | 384/492 |

FOREIGN PATENT DOCUMENTS

| | | | |
|---|---|---|---|
| JP | 3-88024 | | 9/1991 |
| JP | 05026237 A | * | 2/1993 |
| JP | 05-209621 | | 8/1993 |
| JP | 10-299774 | | 11/1998 |
| JP | 11-106779 | | 4/1999 |
| JP | 11247862 A | * | 9/1999 |
| JP | 2000-81045 | | 3/2000 |
| JP | 2000220637 A | * | 8/2000 |
| JP | 2002-61652 | | 2/2002 |
| JP | 2002-221226 | | 8/2002 |
| JP | 2002221226 A | * | 8/2002 |
| JP | 2004-116668 | | 4/2004 |
| WO | WO 02/075172 A1 | | 9/2002 |
| WO | WO2004/072499 A1 | | 8/2004 |

OTHER PUBLICATIONS

International Search Report dated Mar. 20, 2006.
English Translation of a Japanese Office Action dated Feb. 25, 2010.
English Translation of a Japanese Office Action dated Dec. 9, 2009.

* cited by examiner

TOUCHDOWN BEARING

TECHNICAL FIELD

The present invention relates to a touchdown bearing for protecting a rotor, supported by magnetic bearings in a turbo-molecular pump, at the time of stop of the rotation or at the time of abnormal rotation.

BACKGROUND ART

In turbo-molecular pumps, there has been extensively used a construction in which a rotor having exhaust blades is supported in a non-contact manner by magnetic bearings. Its example is shown in FIG. 4 by way of a cross-sectional view. In this example, fixed blades 11 are arranged on an inner periphery of a case 10, and also a rotary shaft 13 having rotary blades 12 fixed to an outer periphery thereof is rotatably disposed within this case 10. Rotation is imparted to this rotary shaft 13 by an electric motor 14, and in its rotating condition the rotary shaft 13 is supported in a magnetically floated condition in a non-contact manner by two radial magnetic bearings 15, 16 disposed in proximity to an outer peripheral surface of the rotary shaft 13 and a pair of axial magnetic bearings 17 disposed respectively at upper and lower sides of a flange portion 13a formed integrally with the rotary shaft 13. Incidentally, in the drawing, 9 denotes an intake port, and 8 denotes an exhaust port.

Also, full complement ball bearing 21 with one deep groove and a pair of angular contact ball bearings 22 which are combined together in such a manner that their angular contact directions are reversed to each other are disposed as touchdown bearings within the case 10. These touchdown bearings 21, 22 are rolling bearings for protecting the rotary shaft 13 from damage caused by contact with the radial magnetic bearings 15, 16 and the axial magnetic bearing 17 at the time of stop of the rotary shaft 13 and at the time of occurrence of a control abnormality, and a clearance slightly smaller than a clearance between the rotary shaft 13 and each of the magnetic bearings 15, 16 and 17 is provided between the outer peripheral surface of the rotary shaft 13 and an inner peripheral surface of an inner ring of each of the touchdown bearings 21, 22. With this arrangement, in a condition in which the rotary shaft 13 is rotatably supported in a magnetically floated condition by the magnetic bearings 15, 16 and 17, the rotary shaft 13 is held in a non-contact condition relative to each touchdown bearing 21, 22. However, at the time of stop of the rotary shaft 13 or at the time of occurrence of a control abnormality due to an influence of an external force or the like, the rotary shaft 13 contacts the inner rings of the touchdown bearings 21, 22 and is rotatably supported by them before the rotary shaft 13 contacts the magnetic bearings 15, 16 and 17.

Incidentally, although the foregoing shows the example in which the inner rings serve as the rotary rings, there is known a structure in which a tubular rotor with rotary blades is used, and touchdown bearings are disposed within this tubular rotor. In this structure, outer rings of the touchdown bearings are disposed on an inner peripheral surface of the tubular rotor through a predetermined clearance, and the inner peripheral surface of the rotor contacts outer peripheral surfaces of the outer rings of the touchdown bearings at the time of stop of the rotor or at the time of occurrence of a control abnormality, so that the rotor is rotatably supported.

In the above touchdown bearings in the vacuum pump, in many cases, ceramics or stainless steel such as SUS440C is used as a material for rolling elements (balls), and similar stainless steel such as SUS440C or bearing steel such as SUJ2 is used. And, in view of the environment in which it is used, lubricating oil can not be used, and therefore a coating composed of any of various solid lubricants including as a representative example molybdenum disulfide is formed on at least one of the surfaces of these members contacting other members (see, for example, Patent Literature 1).

Here, in this kind of touchdown bearing, the durability of the coating of the solid lubricant whose representative example is molybdenum disulfide determines the durability of the bearing itself. Therefore, in order to enhance the adhesion of molybdenum disulfide to a substrate, a processing for forming microscopic pits and projections on a surface by shot blasting or the like is conventionally usually effected as an undercoat processing for the molybdenum disulfide coating.

With respect to balls, an Ag ion-plated coating or the like serving as a solid lubricant coating is adopted. Patent Literature 1: JP-A-2002-221226 Publication

DISCLOSURE OF THE INVENTION

Problem that the Invention is to Solve

By the way, in the conventional structure in which the pits and projections are applied by shot blasting, and then the coating of the solid lubricant such as molybdenum disulfide is formed as described above, when the solid lubricant such as molybdenum disulfide is worn out from the surface by repeated touchdown, this triggers accelerating damage of the bearing, and as a result there were sometimes encountered cases where the expected durability could not be secured.

Furthermore, particularly in the full complement ball bearing, the Ag ion-plated coating formed on the surfaces of the balls has a problem that it has a poor wear resistance since the balls, while pressed against each, rub against each other. Here, in the case where ceramics-made balls are used, a satisfactory lifetime is obtained, but the cost is high, and besides in the case of using the balls made of ceramics which is a non-magnetic substance, there often develops an undesirable situation in which the rotary ring of the touchdown bearing is dragged by a magnetic field produced by a magnetic bearing except at the time of touchdown, that is, when the rotor is not contacted with the rotary ring of the touchdown bearing, and in some cases, it can not be used.

The present invention has been made in view of the above circumstances, and its main object is to provide a touchdown bearing whose durability can be enhanced as compared with a conventional one in which a solid lubricant coating is formed on a surface of stainless steel or bearing steel and with a conventional one in which a metal solid lubricant is ion-plated.

Also, another object of the present invention is to provide a touchdown bearing in which the above-mentioned drag phenomenon is prevented while obtaining the durability generally equivalent to that of a conventional one using ceramics-made balls, and also the cost can be reduced.

Means for Solving the Problem

A touchdown bearing of the present invention is used in a turbo-molecular pump having a rotor supported by a magnetic bearing, in which only at the time of stop of the rotor or at the time of abnormal rotation, an inner ring or an outer ring contacts the rotor to support this rotor, and the touchdown bearing is characterized in that a calcium zinc phosphate-type coating is formed on at least one of the surfaces of members (that is, an inner ring, an outer ring and rolling elements (balls) and further a cage (if the cage is used)) which form the bearing and contact other members, and further a molybdenum disulfide coating is formed thereon.

Here, in the present invention, there can be suitably adopted a construction in which the balls among the members forming the bearing are high speed tool steel or bearing steel, and the calcium zinc phosphate-type coating is formed on their surfaces, and further the molybdenum disulfide coating is formed thereon.

Furthermore, in the present invention, there can be adopted a construction in which the inner ring and/or the outer ring among the members forming the bearing are high speed tool steel or bearing steel, and the calcium zinc phosphate-type coating is formed on a raceway surface thereof, and further the molybdenum disulfide coating is formed thereon.

The present invention seeks to solve the problem, utilizing heat resistance of the calcium zinc phosphate-type coating among chemical conversion coatings and its ability to easily maintain the roundness (sphericity) due to the ability of controlling a coating thickness in combination with the lubricating ability originally possessed by the chemical conversion coating and the adhesion of the molybdenum disulfide coating due to pits and projections formed by crystal grains on the surface of the coating.

Namely, when the calcium zinc phosphate-type coating is formed, and further the molybdenum disulfide coating is formed thereon, the adhesion thereof is enhanced by the microscopic pit and projections on the surface of the calcium zinc phosphate-type coating as compared with the case where microscopic pits and projections are merely physically formed on the substrate by shot blasting or the like. Also, the durability is enhanced as compared with the case where metal with the lubricating ability such as Ag is ion-plated. Furthermore, even after the molybdenum disulfide coating is worn out, the calcium zinc phosphate-type coating covers the metal surface, and therefore abrupt damage due to metal contact will not occur, and therefore the durability of the bearing is much more enhanced as compared with conventional ones.

And, the calcium zinc phosphate-type coating can be more easily controlled to a small coating thickness as compared with other chemical conversion coatings such as a manganese phosphate-type coating, and the roundness and sphericity of the substrate can be easily maintained, and also when it is used at high temperature in a vacuum, the decay of crystallization water in the coating is gentle, and even when it is used as an undercoat processing coating for each member of the touchdown bearing, an abrupt deterioration of the coating will not occur, and the durability can be secured also in this respect. Here, the formation of a calcium zinc phosphate-type coating on stainless steel is difficult, but even when a material liable to rust such as bearing steel or high speed tool steel is used as the substrate, a sufficient corrosion resistance can be obtained by the calcium zinc phosphate-type coating.

Furthermore, the balls are made of high speed tool steel or bearing steel, and the calcium zinc phosphate-type coating and the molybdenum disulfide coating are formed on their surfaces, and by doing so, even when the ball and the ball contact hard each other in a full complement ball bearing, the sufficient lubricating ability can be maintained for a long period of time, and the balls substituting for ceramics-made balls contribute to the reduction of the cost.

SKH4, M50 (AISI Standard) having heat resistance, etc., are given as examples of the high speed tool steel used for the inner ring, the outer ring and the rolling elements, and SUJ2, etc., are given as an example of the bearing steel.

Furthermore, in the present invention, it is preferred that the material of the balls which is an obstacle to the durability of the bearing be high speed tool steel which is a metal material having high hardness at high temperature.

Namely, the hardness of high speed tool steel (whose representative example is SKH4) at temperatures of 200 to 300° C. (which the temperature of the balls is expected to reach at the time of touchdown in the touchdown bearing) is about 5 to 15 HRC higher as compared with bearing steel whose representative example is SUJ2 and stainless steel whose representative example is SUS440C. Therefore, premature damage which is due to heat generated by the friction with the bearing rings caused by abrupt acceleration at the time of touchdown and is also due to heat generated by the friction between the balls in the case of the full complement ball bearing can be prevented from occurring. SKH4, M50 (AISI Standard) having heat resistance, etc., are given as examples of the high speed tool steel used for the balls.

And, high speed tool steel and bearing steel are magnetic materials, and therefore magnetic flux due to a magnetic field produced by a nearby magnetic bearing reaches the fixed ring via the rotary ring and the balls, and therefore the drag of the rotary ring will not occur at the time of non-touchdown. Also, the undercoat processing for the solid lubricant coating is easy, and besides the increase of the cost can be suppressed.

Advantages of the Invention

In the present invention, the adhesion of the molybdenum disulfide is enhanced as compared with the case where microscopic pits and projections are merely applied by shot blasting or the like for the undercoat processing for the molybdenum disulfide, and besides even when the molybdenum disulfide is worn out by repeated touchdown, the wear resistance is maintained since the calcium zinc phosphate-type coating is formed under it, and the durability of the bearing is enhanced, and also the cost can be reduced as compared with the case where an Ag ion-plated coating is applied.

Furthermore, the balls are made of high speed tool steel or bearing steel, and the calcium zinc phosphate-type coating and the molybdenum disulfide coating are formed on their surfaces, and by doing so, even when the ball and the ball, applied to a full complement ball bearing, contact hard each other, the sufficient lubricating ability can be maintained for a long period of time, and as a result the reduction of the cost can be achieved by substitution for ceramics-made balls, and besides the development of the drag phenomenon can be suppressed.

Furthermore, in the present invention, the material of the balls is the high speed tool steel, and by doing so, the hardness of the balls during the generation of heat at the time of touchdown is higher as compared with the case where the conventional stainless steel or bearing steel is used, and therefore premature damage of the balls which is an obstacle to the durability of a bearing of this kind will not occur, and the durability of the bearing can be enhanced. This advantage becomes much greater when the present invention is applied to the touchdown full complement ball bearing as in the invention of claim 2 in which heat is generated by the friction between the balls.

Furthermore, as compared with the conventional touchdown bearing using ceramics-made balls, the prevention of the drag of the rotary ring, the enhancement of the adhesion of the solid lubricant coating due to ease of the undercoat processing, and the reduction of the cost can be achieved.

BEST MODE FOR CARRYING OUT THE INVENTION

An embodiment of the present invention will hereafter be described with reference to the drawings.

Figure 1:
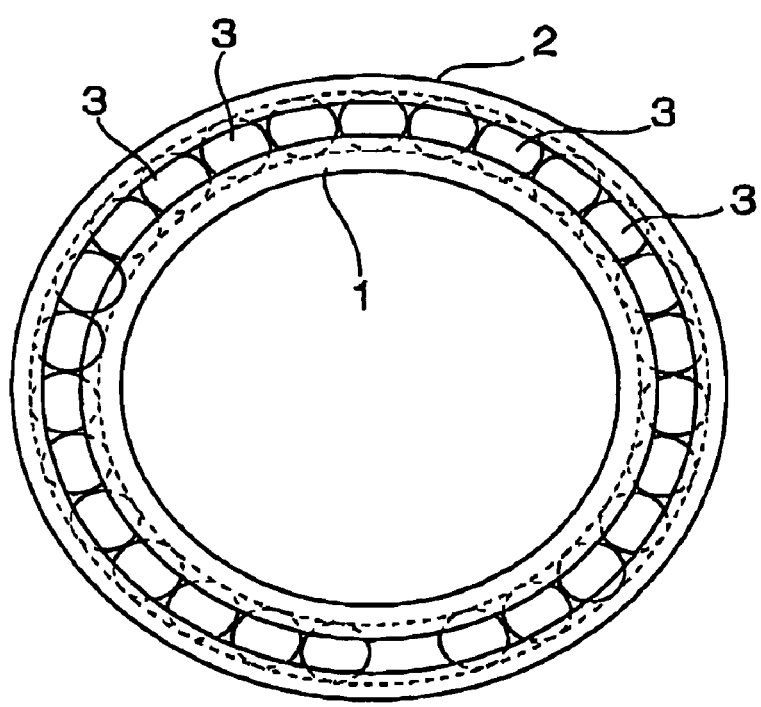
FIG. 1 is a front-elevational view of an embodiment in which the present invention is applied to a touchdown bearing for a turbo-molecular pump which comprises a deep groove ball bearing of the full ball type.
Figure 2:
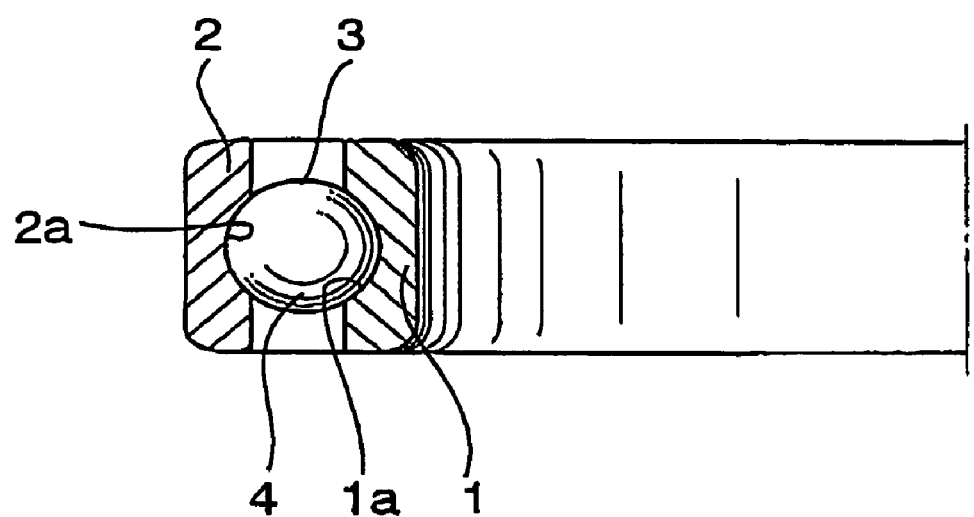
FIG. 2 is a cross-sectional view taken along a line parallel to an axis of FIG. 1.
Figure 4:
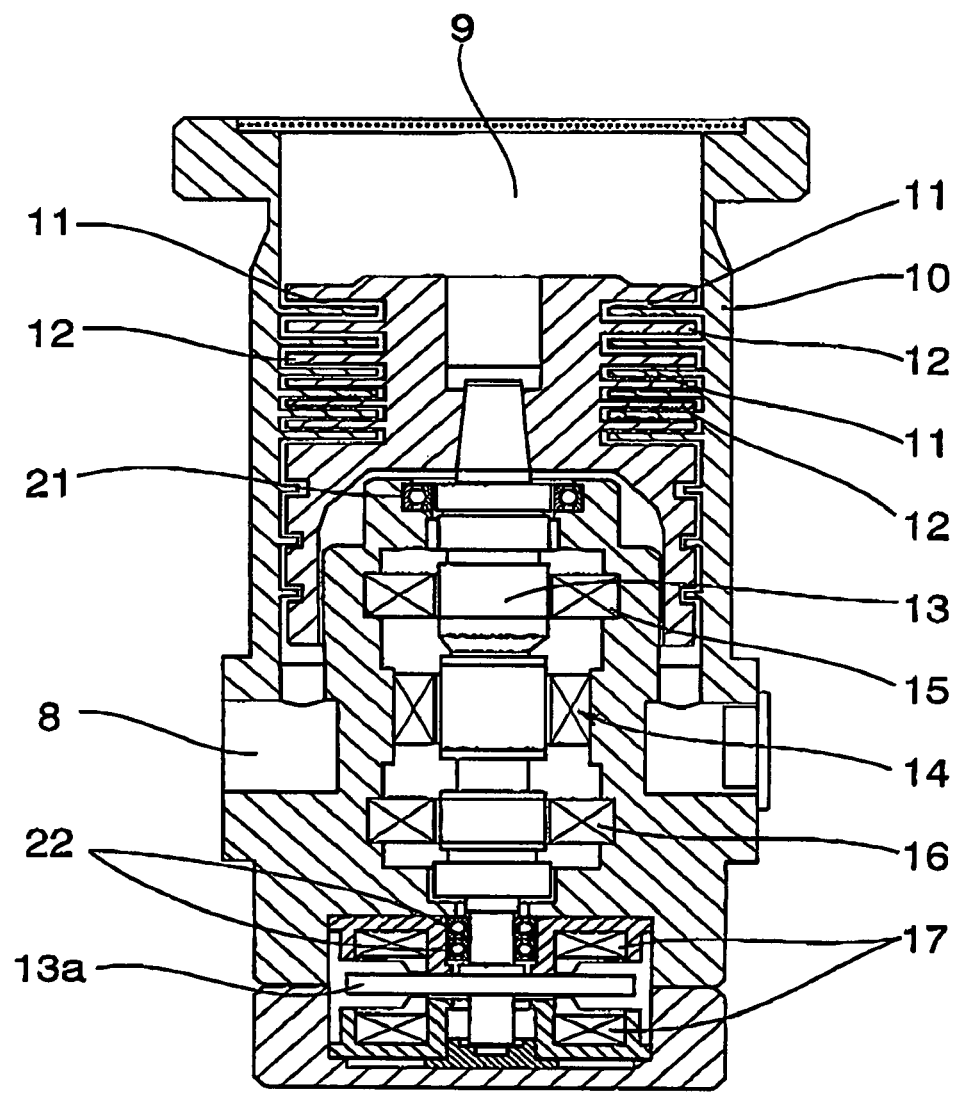
FIG. 4 is a cross-sectional view showing an example of a construction of a turbo-molecular pump provided with touchdown bearings.

FIG. 1 is a front-elevational view of the embodiment in which the present invention is applied to the touchdown bearing of FIG. 4 comprising the deep groove ball bearing of the full ball type, and FIG. 2 is cross-sectional view taken along a line parallel to an axis.

In this example, each of an inner ring 1 and an outer ring 2 is made of SUS440C which is martensite-type stainless steel, and a plurality of balls 3 made of SKH4 (which is high speed tool steel) are disposed between these rings.

Microscopic pits and projections are formed by shot blasting on entire surfaces of the inner ring 1 and outer ring 2 including raceway surfaces 1a and 2a, and a molybdenum disulfide coating is formed thereon.

Figure 3:
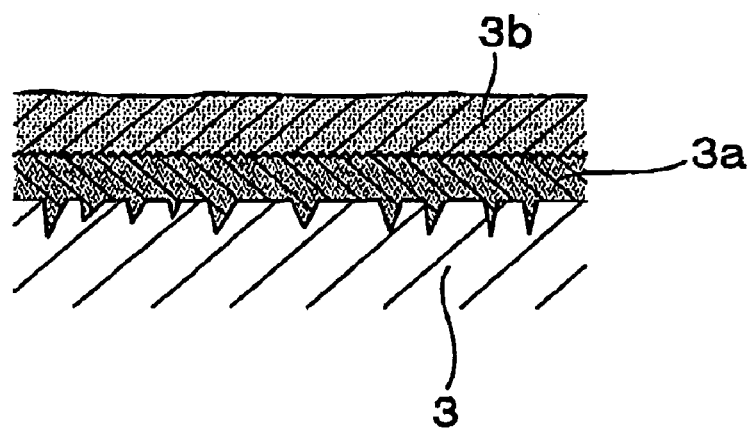
FIG. 3 is a schematic enlarged cross-sectional view of a surface structure of a ball 3 in the embodiment of the present invention.

On the other hand, microscopic pits and projections are formed on a surface of each ball 3 by shot blasting, and as illustrated in FIG. 3 showing its schematic enlarged cross-sectional view, a calcium zinc phosphate-type coating 3a is formed, and further a molybdenum disulfide coating 3b is formed thereon. As the calcium zinc phosphate-type coating 3a, for example, one expressed by a chemical formula, (Zn2Ca)(PO4)2.2H2O, can be used, and a processing process is equivalent to an ordinary chemical conversion processing process, and a construction involving the washing, pickling, washing, surface adjustment, chemical conversion, washing and drying of a substrate can be adopted. In the chemical conversion process, a solution of calcium zinc phosphate corrodes part of the surface of the ball 3 (which is the substrate) made of SKH4, and the formed calcium zinc phosphate-type coating 3a is disposed in a biting-condition relative to the substrate as illustrated, and has excellent adhesion.

A thickness of this calcium zinc phosphate-type coating 3a is not particularly limited, but the control of the coating thickness is easier as compared with other chemical conversion coating treatments such for example as a manganese phosphate-type coating treatment, and it is not difficult to control the thickness to about 1 to 2 μm, and therefore it is easy to maintain the roundness of the ball 3 which is the substrate.

And besides, the microscopic pits and projections due to crystal grains are formed on the surface of this calcium zinc phosphate-type coating 3a, and therefore the molybdenum disulfide coating 3b formed on this surface has high adhesion because of an anchoring effect.

In the above embodiment of the present invention, even when the balls 3 rub hard against each other during rotation, the molybdenum disulfide coating 3b on the surface hardly peels off, and besides even after this molybdenum disulfide coating 3b is worn out, the calcium zinc phosphate-type coating 3a underlying it functions as a lubricant layer, and therefore this will not lead to accelerating bearing damage, so that the durability is enhanced. And, when the calcium zinc phosphate-type coating 3a is used at high temperature in a vacuum, the decay of crystallization water is gentler as compared with a manganese phosphate type, and therefore an abrupt deterioration of the coating hardly develops. And besides, the ball 3 made of SKH4 is covered with the calcium zinc phosphate-type coating 3a over its entire peripheral surface, and therefore a sufficient corrosion resistance is obtained.

Furthermore, high speed tool steel such as SKH4 is used as the substrate material of the ball 3, so that the strength at high temperature is high, and the number of times for touchdown which is approximate to that obtained with the use of ceramics-made balls can be achieved, and besides because of the magnetic material, the drag of the rotary ring by a magnetic field produced by the magnetic bearing of the turbo-molecular pump at the time of non-touchdown is prevented.

In the above embodiment of the present invention, the hardness of SKH4 (which is the material for the balls 3) in a condition of expected high temperature (200 to 300° C.) due to heat generated by rubbing of the inner ring 1 and outer ring 2 and balls 3 against each other at the time of touchdown is about 5 to 15 HRC higher as compared with the case where SUJ2, SUS440C or the like is used. Therefore, a premature damage due to heat generated at the time of touchdown hardly occurs, and in cooperation with the high adhesion of the molybdenum disulfide coating (formed on its surface) relative to the ball 3, the durability of the bearing is markedly enhanced.

And besides, its cost can be kept to a low level as compared with the case where ceramics-made balls are used, and also when the bearing is incorporated into the turbo-molecular pump, the inner ring 1 will not be dragged by a magnetic field produced by the nearby magnetic bearing at the time of non-touchdown.

In the above embodiment, there is used the type in which only the balls 3 are made of SKH4, and the calcium zinc phosphate-type coating 3a and the molybdenum disulfide coating 3b are formed on their surfaces, and with respect to the inner ring 1 and the outer ring 2, the microscopic pits and projections are imparted by shot blasting to the surface of each of the inner and outer rings made of SUS440C equivalent to that used for conventional ones, and then the molybdenum disulfide coating is formed thereon. However, there can be used the type in which the inner ring 1 and/or the outer ring 2 are also made of high speed tool steel such as SKH4 or bearing steel such as SUJ2, and a calcium zinc phosphate-type coating equivalent to the above-mentioned one is formed on the surface thereof, and then a molybdenum disulfide coating is formed thereon. In this case, also, the adhesion of the molybdenum disulfide coating is higher as compared with the case where a molybdenum disulfide coating is merely formed after imparting microscopic pits and projections by shot blasting, and the durability can be enhanced. In this case, it is more preferred that the microscopic pits and projections be formed by shot blasting before the calcium zinc phosphate-type coating is formed. And, such inner ring 1 and/or such outer ring 2 may be combined with ceramics-made balls. Furthermore, with respect to the balls 1, bearing steel can be used as their material.

Incidentally, in the above embodiment, there has been shown the example in which the present invention is applied to the full complement ball bearing with deep groove, it may be an angular contact ball bearing, and furthermore the invention can be equally applied to other ball bearings each with a cage than the full complement ball bearing. Furthermore, although the high speed tool steel used for the balls 3 is not necessarily limited to SKH4, it is preferred from the viewpoints of availability, the cost, processability, etc., that SKH4 or M50 (AISI Standard) or high speed tool steel analogous thereto be adopted.

In a touchdown bearing which is not of the full complement ball bearing but is provided with a cage, a calcium zinc phosphate-type coating and a molybdenum disulfide coating are preferably formed on balls and an inner ring and/or an outer ring as described above, and in addition equivalent coatings are preferably formed also on the cage. In this case, various carbon steels and others can be used as a material for the cage.

Furthermore, in the above embodiment, although the microscopic pits and projections are formed by shot blasting on the entire surfaces of the inner ring 1 and outer ring 2 including the raceway surfaces 1*a* and 2*a*, there may, of course, be used an arrangement in which microscopic pits and projections are formed by shot blasting only on the raceway surfaces 1*a* and 2*a* of the inner ring 1 and outer ring 2, and a molybdenum disulfide coating is formed thereon. In some cases, the formation of the coating on the bearing rings may be omitted.

Furthermore, in the above embodiment, the microscopic pits and projections are formed on the surface of the ball 3 by shot blasting, and the calcium zinc phosphate-type coating 3*a* is formed, and further the molybdenum disulfide coating 3*b* is formed thereon. However, there may be used an arrangement in which the shot blasting is not effected, and the calcium zinc phosphate-type coating 3*a* is formed, and further the molybdenum disulfide coating 3*b* is formed thereon. In this case, also, as compared with the case where a molybdenum disulfide coating is merely formed and with the case where microscopic pits and projections are formed by shot blasting, and a molybdenum disulfide coating is formed, the adhesion of the molybdenum disulfide is enhanced, and the wear resistance is also enhanced, and therefore the durability of the bearing is enhanced.

The invention claimed is:

1. A touchdown bearing for use in a turbo-molecular pump, comprising:
    a rotor supported by a magnetic bearing,
    wherein, only at a time of stop of the rotor or at a time of abnormal rotation, an inner ring or an outer ring contacts the rotor to support the rotor,
    wherein a calcium zinc phosphate coating is formed on at least one of surfaces of a plurality of members that forms the bearing and contacts other members, microscopic pits and projections due to crystal grains of the calcium zinc phosphate coating are formed on a surface of the calcium zinc phosphate coating, and a molybdenum disulfide coating is formed on the surface of the calcium zinc phosphate coating on which the microscopic pits and projections are formed,
    wherein the touchdown bearing comprises a full complement ball bearing,
    wherein the plurality of members comprise a plurality of balls,
    wherein the plurality of balls are made of high speed tool steel,
    wherein the calcium zinc phosphate coating is formed on a surface of the plurality of balls, and
    wherein the molybdenum disulfide coating is formed on the calcium zinc phosphate coating.

2. The touchdown bearing recited in claim 1, wherein the calcium zinc phosphate coating is formed on the surface of the plurality of balls on which microscopic pits and projections are formed by shot blasting.

3. The touchdown bearing recited in claim 1, wherein the high speed tool steel comprises SKH4 of JIS Standard.

4. The touchdown bearing recited in claim 1, wherein the high speed tool steel comprises M50 of AISI Standard.

5. The touchdown bearing recited in claim 1, wherein of the members forming the bearing, the inner ring and/or the outer ring comprise high speed tool steel or bearing steel, and the calcium zinc phosphate coating is formed on a raceway surface thereof, and further the molybdenum disulfide coating is formed thereon.

6. The touchdown bearing recited in claim 1, wherein the touchdown bearing is used in vacuum.

7. The touchdown bearing recited in claim 2, wherein the touchdown bearing is used in vacuum.

8. The touchdown bearing recited in claim 1, wherein the plurality of balls contact with each other.

9. The touchdown bearing recited in claim 1, wherein the calcium zinc phosphate coating is formed in between the molybdenum disulfide coating and the surface of the plurality of balls.

10. The touchdown bearing recited in claim 1, wherein a first surface of the calcium zinc phosphate coating is in contact with the surface of the plurality of balls, and a second surface of the calcium zinc phosphate coating opposite the first surface of the calcium zinc phosphate coating is in contact with the molybdenum disulfide coating.

11. A touchdown bearing, comprising:
    an inner ring;
    an outer ring; and
    a plurality of balls in between the inner ring and the outer ring,
    wherein the touchdown bearing comprises a full complement ball bearing,
    wherein the plurality of balls are made of high speed tool steel,
    wherein a molybdenum disulfide coating is formed on the plurality of balls, and
    wherein a calcium zinc phosphate coating is formed between a surface of the plurality of balls, and the molybdenum disulfide coating.

12. The touchdown bearing recited in claim 11, wherein the calcium zinc phosphate coating is formed on the surface of the plurality of balls on which microscopic pits and projections are formed by shot blasting.

13. The touchdown bearing recited in claim 11, wherein the plurality of balls are in contact with each other.

14. A touchdown bearing, comprising:
    an inner ring;
    an outer ring;
    a plurality of balls in between the inner ring and the outer ring,
    wherein the touchdown bearing comprises a full complement ball bearing,
    wherein the inner ring and the outer ring are made of martensite stainless steel,
    wherein the plurality of balls are made of high speed too steel,
    wherein a molybdenum disulfide coating is formed on raceway surfaces of the inner ring and the outer ring, and
    wherein a calcium zinc phosphate coating is formed between a surface of each ball and the molybdenum disulfide coating.

15. The touchdown bearing recited in claim 14, wherein the calcium zinc phosphate coating is formed on the surface of the plurality of balls on which microscopic pits and projections are formed by shot blasting.

16. The touchdown bearing recited in claim 14, wherein the high speed tool steel comprises SKH4 of JIS Standard.

17. The touchdown bearing recited in claim 14, wherein the high speed tool steel comprises M50 of AISI Standard.

18. The touchdown bearing recited in claim 14, wherein the martensite stainless steel comprises SUS440C.

19. The touchdown bearing recited in claim 14, wherein molybdenum disulfide coating is formed on the raceway surfaces of the inner ring and the outer ring on which microscopic pits and projections are formed by shot blasting.

* * * * *